United States Patent [19]

Hayashi

[11] 4,019,777
[45] Apr. 26, 1977

[54] LUMBAR SUPPORT REGULATING APPARATUS

[75] Inventor: Masayuki Hayashi, Toyohashi, Japan

[73] Assignee: Aisin Seiki Kabushiki Kaisha, Kariya, Japan

[22] Filed: Jan. 30, 1976

[21] Appl. No.: 653,692

[30] Foreign Application Priority Data

Feb. 6, 1975 Japan .............................. 50-15594

[52] U.S. Cl. ................................................ 297/284
[51] Int. Cl.² .......................................... A47C 3/00
[58] Field of Search ...................... 267/89; 297/284

[56] References Cited

UNITED STATES PATENTS

| | | | |
|---|---|---|---|
| 3,178,221 | 4/1965 | Schwarz | 297/284 |
| 3,378,299 | 4/1968 | Sandor | 297/284 |

*Primary Examiner*—James C. Mitchell
*Attorney, Agent, or Firm*—Sughrue, Rothwell, Mion, Zinn & Macpeak

[57] ABSTRACT

A vehicle seat of the type having a seat back with a plurality of transverse serpentine springs therein is provided with a regulating apparatus for adjusting the firmness of the lowermost springs to adjust the firmness of the seat back in the lumbar region. A torsion spring is wrapped about a vertically extending post in the lower corner of the seat back with one end thereof operatively engaged with the seat spring adjacent the lower center portion of the seat back and the opposite end being secured to a nut threaded on a rotatable shaft so that rotation of the shaft will vary the force of the torsion spring on the seat spring.

6 Claims, 4 Drawing Figures

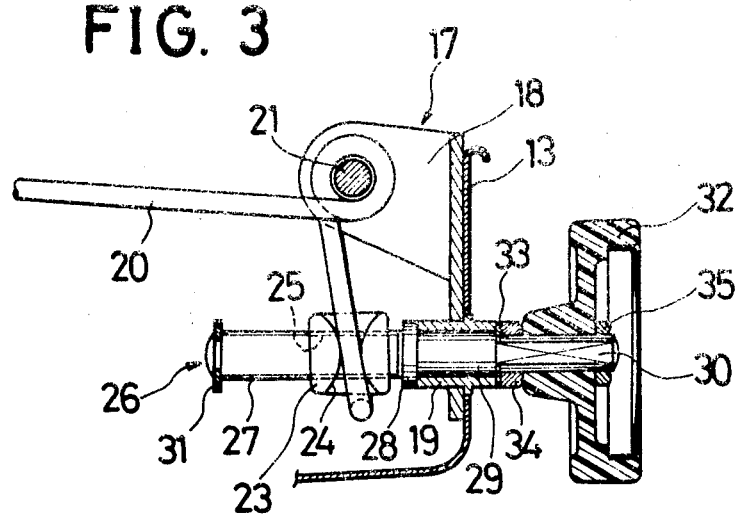
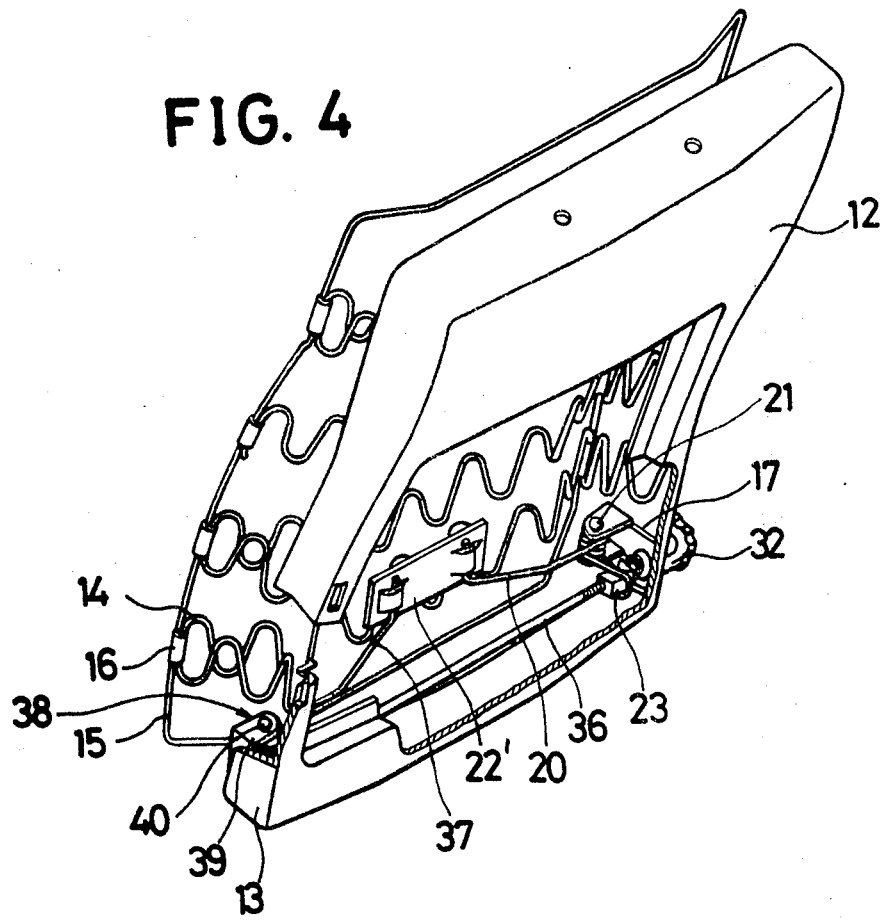

LUMBAR SUPPORT REGULATING APPARATUS

BACKGROUND OF THE INVENTION

1. Field of the Invention

The present invention relates generally to a lumbar support regulating apparatus in a seat back and more particularly to such an apparatus in a vehicle seat back.

2. Description of the Prior Art

In general, the use of a lumbar support regulating apparatus in the seat back of a motor vehicle seat is known so that the hardness of the cushion of the seat back which is in contact with the lumbar region of a person seated on the seat can be suitably regulated. Conventionally, a cam mechanism or a combination wire and link mechanism are in wide use for regulating the hardness of the cushion of the seat back. However, the cam mechanisms currently in use can only perform a stepped regulation and it is impossible to obtain fine adjustments. The combination wire and link mechanisms have poor lasting qualities since the wire is always maintained in a strained condition. Furthermore, such a wire and link mechanism makes it difficult to enlarge the regulating stroke in a limited space and the arrangement is unstable upon vibration or impact.

SUMMARY OF THE INVENTION

The present invention provides an improved lumbar support regulating apparatus which obviates the drawbacks of the above-mentioned conventional regulating devices.

The lumbar support regulating apparatus according to the present invention provides a unique and highly simplified lumbar support regulating apparatus.

The lumbar support regulating apparatus according to the present invention is comprised of a torsion spring and screw regulating means for the torsion spring which are disposed behind the springs of the cushion member of the seat back in order to regulate the hardness in an infinitely adjustable manner. Since the load of the torsion spring is always acting on the screw regulating means the hardness of the cushion of the seat back is not influenced by vibrations or impacts. Furthermore, the screw regulating means is disposed at the side of the seat back frame so that the regulating stroke of the screw regulating means and the torsion spring can be relatively large for a narrow space.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 3 is a sectional view through the regulating apparatus on the seat back according to the present invention.

FIG. 4 is a view similar to FIG. 2 showing a modified form of regulating apparatus.

DETAILED DESCRIPTION OF THE PREFERRED EMBODIMENTS

Figure 1:
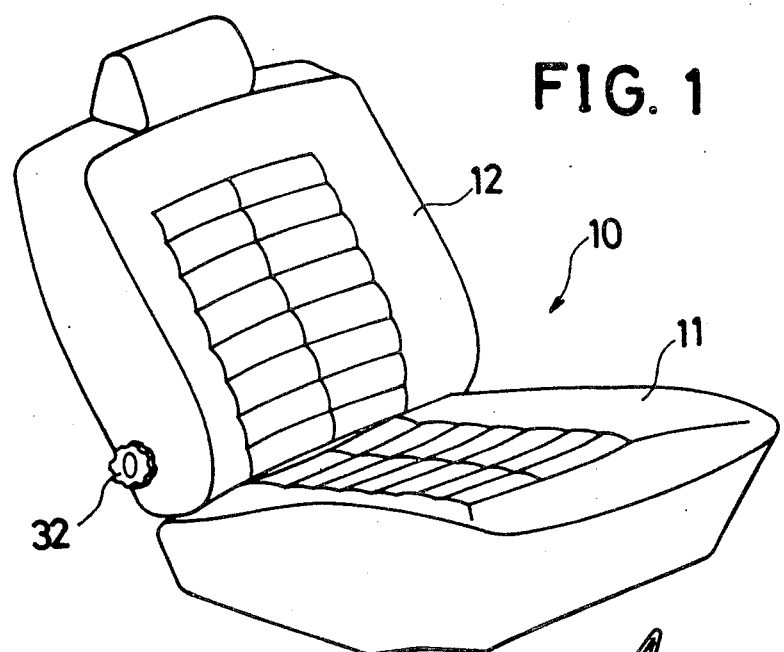
FIG. 1 is a perspective view of a seat assembly according to the present invention.
Figure 2:
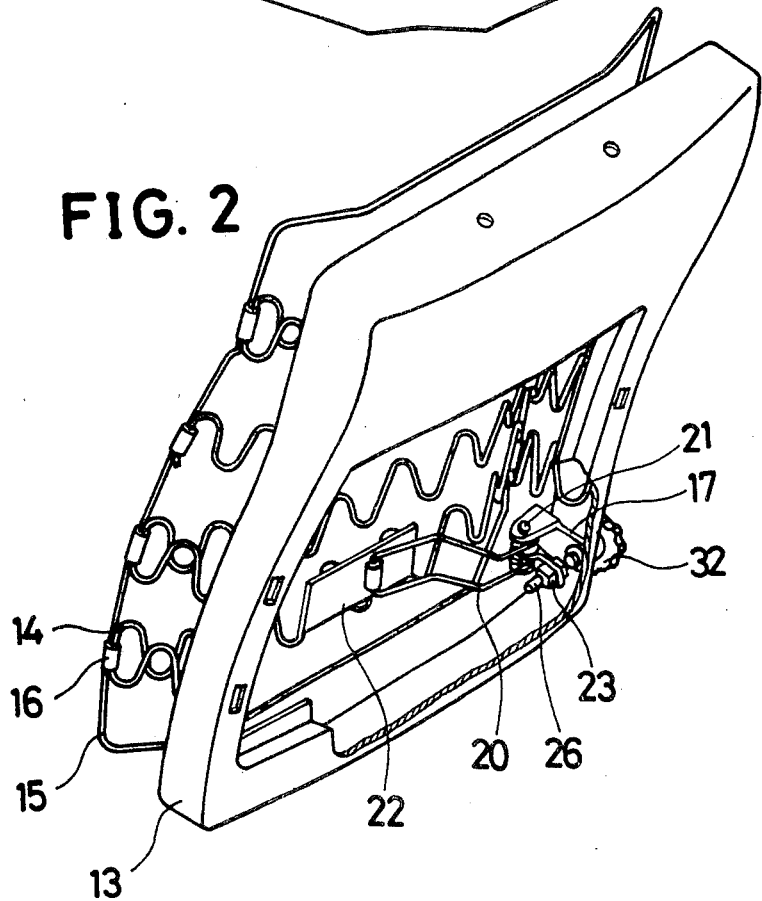
FIG. 2 is a rear perspective view of the seat back of FIG. 1 with the covering removed to show the interior of the seat back.

As best seen in FIG. 1 the seat assembly 10 is comprised of a seat cushion 11 and seat back 12. The interior construction of the seat back 12 in a first embodiment of the invention is shown in FIGS. 2 and 3.

The seat back 12 is comprised of a main frame 13 and an outer spring supporting frame 15 which is arranged generally along the outer circumference of the main frame 13. A plurality of serpentine springs 14 are disposed transversely between the sides of the outer frame 15 and the outer frame 15 is supported on the main frame 13 by separate serpentine springs or extensions of the serpentine springs 14. A bracket 17 is fixed to the inside of the frame 13 adjacent the lower corner thereof and is provided with a flange portion 18 having a pivot pin 21 secured thereto. A torsion spring 20 is coiled about the pivot pin 21 with one end thereof pivotally connected to a lumbar plate 22 which is disposed in contact with the central portion of the lowermost serpentine spring 14. The opposite end of the torsion spring 20 is operatively connected to a nut 23 having an attachment groove 24 formed in the surface thereof. A drive shaft 26 is rotatably journalled in a bearing 19 which is secured in an aperture in the bracket 17. The shaft 26 is axially located within the bearing 19 by means of a flange 28 at one side of the bearing and a washer 33 and nut 34 at the opposite end of the bearing. The torsion spring adjusting nut is threaded on the end portion 27 of the shaft 26 and a snap ring 31 is disposed in a groove at the end of the shaft 26 to prevent the nut 25 from coming off the end of the shaft. The opposite end of the shaft 26 is provided with a flattened side or sides 30 which cooperate with the handle 32 to prevent the handle 32 from turning relative to the shaft 26. This same end of the shaft is also provided with screw threads for receiving the nut 34 as well as the nut 35 which holds the handle on the shaft 26.

In operation, when it is desired to increase the firmness of the cushion in the lower portion of the seat back 12 the handle 32 is rotated in a counterclockwise direction in FIG. 1 thereby rotating the shaft 26 in the same direction. Such rotation will move the nut 23 to the left as viewed in FIS. 2 and 3 to rotate the torsion spring 20 in a clockwise direction about the pivot pin 21 as viewed in FIG. 3. Accordingly, the lumbar plate 22 will be pressed outwardly away from the main frame 13 of the seat back to reinforce the spring 14 which it engages to increase the firmness of the seat cushion in that area.

When it is desired to reduce the firmness of the cushion of the seat back 12, the handle 32 is rotated in the opposite direction to achieve a reverse operation with respect to the torsion spring 20 and the lumbar plate 22.

Referring now to FIG. 4 a second embodiment of the invention is disclosed. Those portions of the second embodiment which are identical to the portions of the first embodiment are designated by the same reference numerals for the sake of convenience.

The drive shaft 26 of FIGS. 2 and 3 has been replaced by a longer drive shaft 36 in FIG. 4 which extends across the entire width of the seat back 12. The torsion spring 20 and the nut 23 are operatively disposed with respect to the drive shaft 36 in FIG. 4 in the same manner which they were operatively disposed with respect to the drive shaft 26 in FIGS. 2 and 3. An additional bracket 38 similar to the bracket 17 is mounted at the opposite lower corner of the main frame 13. The bracket 38 is provided with a flange 39 upon which a pivot pin 40 is mounted. A second torsion spring 37 similar to the torsion spring 20 is coiled about the pivot pin 40 and engages a nut which is threaded on the end of the shaft 36 in a manner similar to the manner in which the torsion spring 20 engages the nut 23. However, the threads for the nut which operates the torsion spring 37 are opposite to the threads for the nut 23 and the shaft 36 at the extreme right-hand end as shown in FIG. 4. The other ends of the torsion springs 20 and 37 are pivotally secured to a lumbar plate 22' which engages the central portion of the lowermost spring 14.

The operation of the embodiment disclosed in FIG. 4 is similar to that of the embodiment disclosed in FIGS. 2 and 3. Upon rotating the handle 32 in one direction the torsion springs 20 and 37 will be pivoted about their respective pivot pins 21 and 40 to move the lumbar support plate 22' outwardly away from the main frame 13 to reinforce the spring 14 and provide a firmer seat cushion in that area. The rotation of the handle 32 in the opposite direction will retract the lumbar support plate 22' to reduce the firmness of the seat cushion.

Although the torsion springs in both embodiments are pivotally connected to a lumbar support plate which in turn bears against the springs of the seat back it is obvious that the torsion spring or springs could be directly in engagement with the spring 14. It is also comtemplated that a plate-type spring could be utilized instead of the torsion spring in each embodiment.

Obviously, many modifications and variations of the present invention are possible in light of the above teachings. It is to be understood therefore, that within the scope of the appended claims, the present invention may be practiced otherwise than as specifically described herein.

What is claimed is:

1. A lumbar support regulating apparatus comprising a seat back having a rigid frame, spring means provided on said seat back, a torsion spring, pivot means on said frame pivotally supporting said torsion spring, a plate member connected to said torsion spring and disposed between said spring means and said torsion spring to distribute the force of said torsion spring to said spring means and a screw regulating means mounted for rotation on said frame and operatively connected to the other end of said torsion spring whereby upon rotation of said screw regulating means said torsion spring is rotated about said pivot means to vary the force said one end of said torsion spring exerts on said spring means, said screw regulating means being provided with stop means to limit the movement of said other end of said torsion spring.

2. A lumbar support regulating apparatus as set forth in claim 1 wherein said apparatus further comprises an additional torsion spring and additional pivot means on said frame for pivotally supporting said torsion spring with one end thereof operatively engaging said plate member and the opposite end operatively connected to said screw regulating means.

3. A lumbar support regulating apparatus as set forth in claim 1 wherein said screw regulating means is disposed for rotation about a horizontal axis adjacent the lower edge of said seat back frame, said pivot means is disposed orthogonal to said horizontal axis and said plate member engages said spring means approximately midway between the sides of said frame adjacent the lower edge thereof.

4. A lumbar support regulating apparatus as set forth in claim 2 wherein said screw regulating means is disposed for rotation about a horizontal axis adjacent the lower edge of said seat back frame, both of said pivot means are disposed orthogonal to said horizontal axis and said plate member engages said spring means approximately midway between the sides of said frame adjacent the lower edge thereof.

5. A lumbar support regulating apparatus as set forth in claim 1 wherein said screw regulating apparatus further comprises a drive shaft bearing means for rotatably supporting said drive shaft on said frame, handle means operatively connected to one end of said drive shaft outwardly of said seat back frame for rotating said drive shaft, thread means upon said drive shaft and a nut member threaded on said thread means and engaging the other end of said torsion spring.

6. A lumbar support regulating apparatus as set forth in claim 2 wherein said screw regulating further comprises a drive shaft, bearing means for rotatably supporting said drive shaft on said seat back frame, handle means operatively connected to one end of said drive shaft outwardly of said seat back frame for rotating said drive shaft, oppositely directed thread means on two spaced apart portions of said drive shaft and a pair of nuts threaded on said oppositely threaded portions and disposed in operative engagement with said other ends of said torsion springs.

* * * * *